E. K. HARVEY.
Harrow and Roller.
No. 78,283.
Patented May 26, 1868.
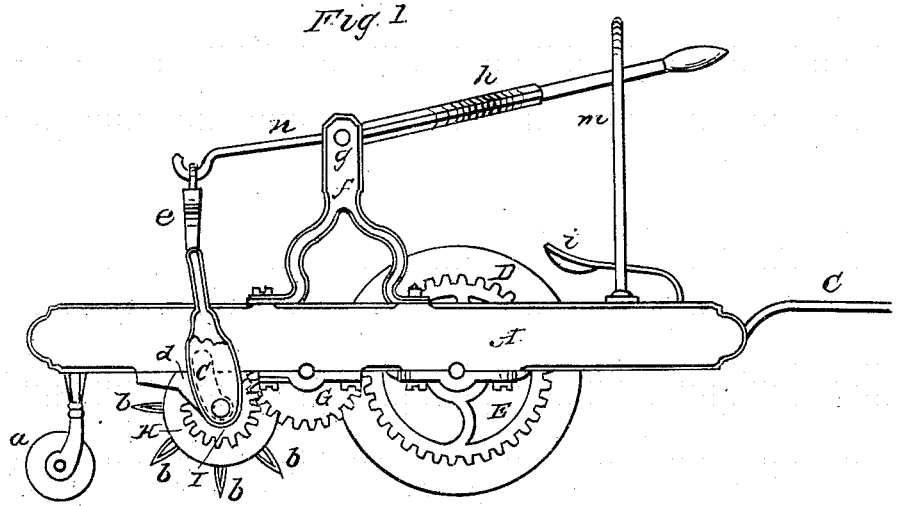
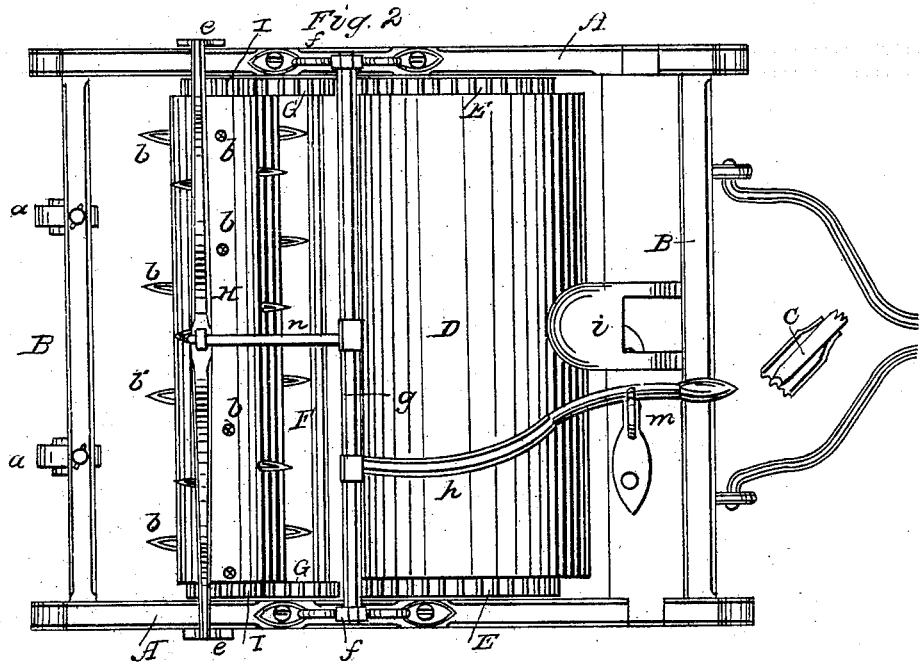
Witnesses
F. C. Somes
Charles Herrm
Inventor
E. K. Harvey
by D E Somes & Co.
attys

United States Patent Office.

E. K. HARVEY, OF QUINCY, OHIO.

Letters Patent No. 78,283, dated May 26, 1868.

---

IMPROVEMENT IN REVOLVING HARROW AND ROLLER.

---

The Schedule referred to in these Letters Patent and making part of the same.

---

TO ALL WHOM IT MAY CONCERN:

Be it known that I, E. K. HARVEY, of Quincy, in the county of Logan, and in the State of Ohio, have invented a new and improved Combined Roller and Revolving Harrow; and I do hereby declare that the following is a full, clear, and exact description thereof, reference being had to the accompanying drawings, and to the letters of reference marked thereon.

Figure 1 is a side elevation of my machine, and

Figure 2 a plan or top view thereof.

The frame of the machine is square, or nearly so, and is composed of the side rails A A, connected by the cross-ties B B.

C is the tongue, to which the team is attached, and $a$ $a$ are caster-wheels, supporting the rear end of the machine.

D is a large cylindrical roller, the length of which is nearly equal to the internal width of the frame. This roller is placed within and near the front of the frame, and at each end are journals, which have their bearings under the side rails A A, as shown in fig. 1. To each end of the roller are rigidly attached the spur-wheels E, the roller and wheels having the same centre of motion.

F is a shaft, extending across the frame, in the rear of and parallel to the roller, and has its bearings under the side rails A. On this shaft, just inside of the side rails, are toothed wheels G, somewhat smaller than the wheels E on the roller, with which they gear.

In the rear of and parallel to the shaft E, is the harrow H, which is a cylinder, of the same length as the roller D, and of about one-half its circumference. In this cylinder the teeth $b$ are inserted, so as to stand out in rays around it. On the ends of the harrow, and having the same centre of motion, are the toothed wheels I, somewhat smaller than the wheels G with which they gear. The journals, on which the harrow revolves, extend through the cam-slots $c$, in the housings $d$, which are secured to the under side of the rails A, and have their bearings in the ends of the spanner $e$, on the outside of the frame. A part of the spanner $e$ is represented as broken away, to show the cam-slot in the housing, which would otherwise be hidden.

Near the centre, on the rails A A, are secured the upright standards $ff$, which support the horizontal rock-shaft $g$. To the rock-shaft is rigidly attached the lever $h$, which extends forward past and in close proximity to the driver's seat $i$, and is adjustable, by means of teeth, in the upright standard $m$. To the centre of the rock-shaft, and extending backward, is an arm, $n$, with a hooked end, to which, by means of a link, the spanner $e$ is suspended.

By lowering the lever $h$, the spanner $e$ will be elevated, carrying with it the harrow, the cam-slots $c$ being so arranged as to unship the wheels I when the harrow is raised from the ground. The harrow may be retained in any position desired, by means of the lever $h$ and toothed standard $m$, and the machine thus used simply as a roller.

This machine is well adapted to the preparation of ploughed ground for receiving seed, the roller levelling the ground, and the harrow pulverizing it, and leaving it in proper condition for receiving the seed. It may also be used for covering seed after it has been sown. Grounds from which crops have recently been taken, and where deep ploughing is not necessary, may be prepared very rapidly, with this machine, for receiving the seed for another crop. Its merits are so obvious that any farmer who sees it will comprehend its utility, and understand how and when to use it.

Having thus described my invention, what I claim as new, and desire to secure by Letters Patent, is—

1. The lever $h$, arm $n$, and spanner $e$, in combination with the harrow H, substantially as described.

2. The harrow H, housings $d$, and spanner $e$, combined and operating substantially as described.

In testimony that I claim the above-described combined roller and revolving harrow, I have hereunto signed my name, this 2d day of March, 1868.

E. K. HARVEY.

Witnesses:
JOSEPH EICKER,
JOHN H. CULP.